United States Patent

Scheerlinck et al.

(10) Patent No.: US 8,372,292 B2
(45) Date of Patent: Feb. 12, 2013

(54) MELT BLOWN POLYMERIC FILTRATION MEDIUM FOR HIGH EFFICIENCY FLUID FILTRATION

(75) Inventors: Philippe M. Scheerlinck, Lakewood, CO (US); Mabrouk Ouedemi, Charlotte, NC (US)

(73) Assignee: Johns Manville, Denver, CO (US)

( * ) Notice: Subject to any disclaimer, the term of this patent is extended or adjusted under 35 U.S.C. 154(b) by 382 days.

(21) Appl. No.: 12/380,437

(22) Filed: Feb. 27, 2009

(65) Prior Publication Data
US 2010/0219138 A1    Sep. 2, 2010

(51) Int. Cl.
*B01D 37/00* (2006.01)
*B01D 46/00* (2006.01)
*B01D 39/16* (2006.01)
*B29C 47/00* (2006.01)

(52) U.S. Cl. ......... 210/767; 55/486; 55/527; 95/273; 210/490; 210/496; 210/505; 210/500.27; 264/176.1; 264/211.14; 264/211.17; 264/211.2; 264/496; 264/639; 428/36.3; 428/36.9; 428/74; 428/113

(58) Field of Classification Search ............ 210/767, 210/496, 500.1, 500.27, 505, 555, 500.21, 210/488–490, 503, 504, 506–509; 95/273, 95/279; 264/465, 496, DIG. 48, 627, 639, 264/175, 176.1, 177.14, 177.17, 211.12, 264/211.14, 211.17, 211.2; 428/36.9, 74, 428/113, 36.3, 316.6; 55/DIG. 5, 382, 486, 55/527; 442/400
See application file for complete search history.

(56) References Cited

U.S. PATENT DOCUMENTS

| | | | | |
|---|---|---|---|---|
| 3,795,571 A * | 3/1974 | Prentice | ......... | 442/346 |
| 3,849,241 A * | 11/1974 | Butin et al. | ......... | 428/137 |
| 4,707,398 A * | 11/1987 | Boggs | ......... | 442/329 |
| 4,950,529 A * | 8/1990 | Ikeda et al. | ......... | 442/400 |
| 5,075,068 A * | 12/1991 | Milligan et al. | ......... | 264/555 |
| 5,160,746 A * | 11/1992 | Dodge et al. | ......... | 425/7 |
| 5,271,883 A | 12/1993 | Timmons et al. | | |
| 5,534,335 A * | 7/1996 | Everhart et al. | ......... | 442/347 |
| 5,723,217 A | 3/1998 | Stahl et al. | | |
| 6,422,848 B1 * | 7/2002 | Allen et al. | ......... | 425/7 |
| 7,081,299 B2 * | 7/2006 | Richeson | ......... | 428/394 |
| 2003/0010002 A1 * | 1/2003 | Johnson et al. | ......... | 55/486 |
| 2004/0083695 A1 * | 5/2004 | Schultink et al. | ......... | 55/382 |
| 2005/0163955 A1 * | 7/2005 | Schaefer et al. | ......... | 428/36.1 |
| 2006/0269748 A1 * | 11/2006 | Jordan et al. | ......... | 428/364 |
| 2008/0017038 A1 * | 1/2008 | Wu | ......... | 96/154 |
| 2008/0217239 A1 * | 9/2008 | Chen et al. | ......... | 210/490 |
| 2008/0318024 A1 * | 12/2008 | Angadjivand et al. | ... | 428/311.51 |
| 2009/0017710 A1 | 1/2009 | Bugada et al. | | |
| 2009/0053959 A1 * | 2/2009 | Datta et al. | ......... | 442/328 |
| 2009/0221047 A1 * | 9/2009 | Schindler et al. | ......... | 435/160 |
| 2010/0043639 A1 * | 2/2010 | Fox et al. | ......... | 96/74 |

FOREIGN PATENT DOCUMENTS

| | | |
|---|---|---|
| EP | 0 890 664 A1 | 1/1999 |
| WO | 0216681 A1 | 2/2002 |
| WO | WO 2007126994 A1 * | 11/2007 |

* cited by examiner

*Primary Examiner* — Joseph Drodge
(74) *Attorney, Agent, or Firm* — Robert D. Touslee

(57) ABSTRACT

Disclosed herein is a polymeric filtration medium including at least one fibrous mat of randomly oriented fibers of a polymer. The polymer has a molecular weight distribution ($M_w/M_n$) between about 1.4 and about 6 and a melt flow rate greater than about 1000 g/10 minutes. Also disclosed herein are methods of making and using the polymeric filtration medium. Further disclosed herein is a composite filtration medium incorporating the polymeric filtration medium.

26 Claims, 8 Drawing Sheets

MELT BLOWN POLYMERIC FILTRATION MEDIUM FOR HIGH EFFICIENCY FLUID FILTRATION

FIELD OF ART

The polymeric filtration medium and its associated methods of making and using disclosed herein, and the composite filtration medium disclosed herein, relate to filtration of solid particulates from fluids.

BACKGROUND

Polymeric separation membranes are typically used in liquid filtration applications requiring high filtration efficiencies of sub-micron particles. Such polymeric separation membranes can be made by suspension deposition. Suspension deposition involves producing a suspension of polymer particles in a solvent; pouring a layer of the suspension; and evaporating the solvent from the poured layer. Such polymeric separation membranes have very small pores, which are suited to efficient separation of submicron, solid particles from fluids. However, polymeric separation membranes are not advantageously used in separations as they are very expensive to produce.

Polymeric filtration media can be produced with melt blowing procedures. Generally, melt blowing produces filtration media having relatively large pores. Therefore, such melt blown polymeric filtration media are too coarse for efficient separation of submicron solid particles from fluids. As a result, such melt blown polymeric filtration media are frequently used in liquid filtration of particles >1 μm.

An alternative process to produce polymeric filtration media is electrospinning. Electrospinning involves applying an electrical charge to a polymer solution or melt. The electrical charge produces electrostatic repulsion, which counteracts the surface tension of the polymer solution or melt. As a result, the polymer stretches into a stream. As the stream dries out in flight, the charge migrates to the surface of stream. Accordingly, the stream thins out until it is deposited as fiber on a grounded collector. Electrospinning produces very fine fibers, which are approximately 0.5 μm or less in diameter. These very fine fibers can provide filtration media with very small pores useful for efficient separation of submicron solid particles from fluids.

However, electro-spun materials are generally not applied in industry. This is due to the fact that electro-spun materials are expensive and are generally not available in commercial quantities.

Thus, there remains a need for a method of making a polymeric filtration medium capable of efficiently separating solid particulates, especially submicron solid particulates, from fluids.

SUMMARY

Disclosed herein is a method of making a polymeric filtration medium, comprising: melting a polymer having a molecular weight distribution ($M_w/M_n$) between about 1.4 and about 6 and a melt flow rate greater than about 1000 g/10 minutes to provide molten polymer; extruding the molten polymer through a plurality of orifices in a die to form continuous primary filaments of polymer; attenuating the continuous primary filaments with an air stream to form discrete meltblown fibers of polymer; cooling the fibers; and collecting the fibers to form at least one fibrous mat of randomly oriented polymeric fibers.

Also disclosed herein is a polymeric filtration medium, comprising: at least one fibrous mat of randomly oriented fibers of a polymer, wherein the polymer has a molecular weight distribution ($M_w/M_n$) between about 1.4 and about 6 and a melt flow rate greater than about 1000 g/10 minutes.

Further disclosed herein is a method of filtering a fluid, comprising: filtering a fluid stream through at least one nonwoven fiber mat of randomly oriented fibers of polymer to provide a filtered fluid stream, wherein the polymer has a molecular weight distribution ($M_w/M_n$) between about 1.4 and about 6 and a melt flow rate greater than about 1000 g/10 minutes.

Additionally disclosed herein is a composite filtration medium, comprising: a first upstream layer comprising at least one nonwoven fiber mat of randomly oriented fibers of a polymer, wherein the polymer has a molecular weight distribution ($M_w/M_n$) between about 1.4 and about 6 and a melt flow rate greater than about 1000 g/10 minutes; and a second downstream layer bonded to the first upstream layer, the second downstream layer comprising at least one polymer membrane.

Among other factors, the filtration media, the method of making a polymeric filtration medium, and the method of filtering a fluid disclosed herein enable filtration of solid particulates from fluids. The filtration media, the method of making a polymeric filtration medium, and the method of filtering a fluid disclosed herein can provide increased fluid filtration efficiency, especially at the submicron level, and may be useful for food filtration.

DETAILED DESCRIPTION

Definitions

Figure 1:
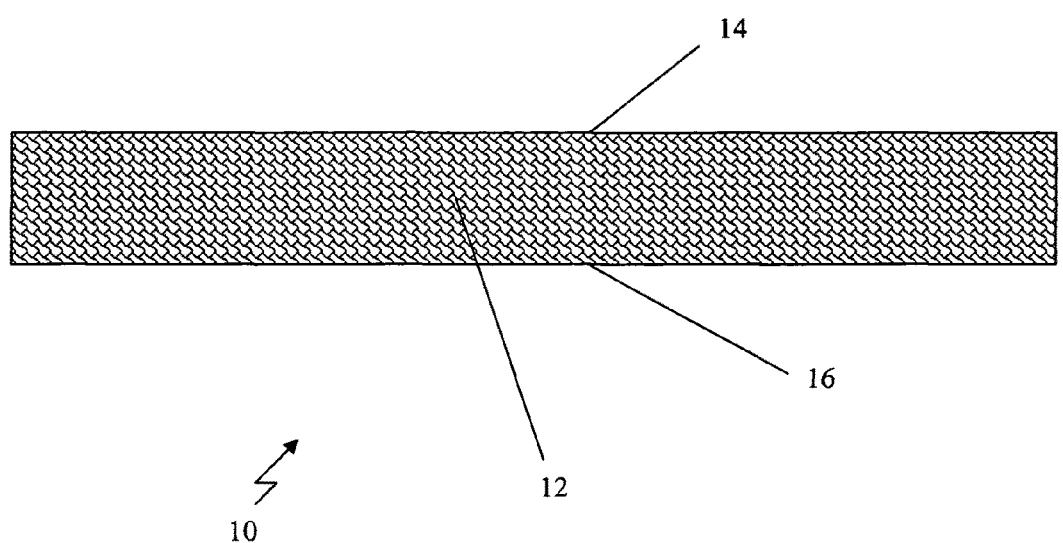
FIG. 1 shows a cross sectional view through a polymeric filtration medium disclosed herein comprised of a single fibrous mat of randomly oriented polymeric fibers.

The following definitions will be used throughout the specification and will have the following meanings unless otherwise indicated.

As used herein, the term "melt flow rate," which is abbreviated "MFR," refers to the fluidity of a polymer as measured by ASTM D 1238.

"Molecular weight distribution" is weight average molecular weight ($M_w$)/number average molecular weight ($M_n$). Molecular weight distribution is also known as the polydispersity index (PDI). It measures the distribution of polymer chain length. As the polymer chains approach uniform chain length, the molecular weight distribution approaches 1.

The term "fluid" refers to both liquids and gases, including mixtures of liquids and gaseous mixtures. An exemplary fluid is air.

The term "efficiency" refers to the percentage of particles of a particular size that do not pass through the at least one fibrous mat of randomly oriented polymeric fibers. The liquid efficiency ratings discussed herein are based on the testing procedure discussed in Example 10.

The term "diameter," when used in reference to particles herein, refers to the diameter of spherical particles and the longest dimension of non-spherical particles.

Method of Making a Polymeric Filtration Medium

Disclosed herein is a method of making a polymeric filtration medium. The method utilizes melt blowing process hardware, which is well known in the art, in conjunction with a particular polymer to produce a polymeric filtration medium having exceptional filtration efficiency. In particular, the present inventors have discovered that utilizing a classic melt blowing process in combination with a polymer having a molecular weight distribution ($M_w/M_n$) between about 1.4 and about 6 and a melt flow rate greater than about 1000 g/10 minutes produces a polymeric filtration medium having exceptional filtration efficiency.

Typically, in a melt blown production process, a mat of melt blown polymeric fibers is made by melting a polymeric material within a melter and extruding the molten polymeric material through a plurality of orifices to form continuous primary filaments. The continuous primary filaments exiting the orifices are introduced directly into a high velocity air stream which attenuates the filaments and forms discrete meltblown fibers from the continuous filaments. The meltblown fibers thus formed are cooled and collected on a collecting belt to form a mat of randomly oriented polymeric fibers having a basis weight ranging from about 5 grams/sq. meter to about 500 grams/sq. meter. During this fiberization process, the molten polymeric material forming the fibers is rapidly cooled from a temperature ranging from about 450° F. to about 500° F. to the ambient temperature of the collection zone, e.g. about 80° F. The meltblown fibers formed by this process typically have a mean diameter from about 0.5 to about 15 microns.

In typical melt blown production processes, the polymeric fibers melt to one another creating fiber to fiber bonds. Accordingly, a binder is not necessary to create fiber to fiber bonds.

The method of making a polymeric filtration medium disclosed herein is an improvement on this conventional melt blown production process. Such method involves melting a polymer having a molecular weight distribution ($M_w/M_n$) between about 1.4 and about 6 and a melt flow rate greater than about 1000 g/10 minutes to provide molten polymer. The method further involves extruding the molten polymer through a plurality of orifices in a die to form continuous primary filaments of polymer. Thereafter, the method involves attenuating the continuous primary filaments with an air stream to form discrete meltblown fibers of polymer. Subsequently, the method involves cooling the fibers and collecting the fibers to form at least one fibrous mat of randomly oriented polymeric fibers.

The polymer may be melted at any suitable temperature. In general, for purposes of efficiency, the polymer is preferably melted at a temperature between about 425° F. and about 550° F. In one embodiment, the polymer may be melted at a temperature between about 450° F. and about 525° F. In another embodiment, the polymer may be melted at a temperature between about 500° F. and about 515° F.

In one embodiment, the method further includes a compression step in which the at least one fibrous mat of randomly oriented polymeric fibers is compressed. The compression step may or may not include heat. For example, a metal roll or a rubber roll may be used to compress the at least one fibrous mat of randomly oriented polymeric fibers. However, the compression step may be a hot calendaring step.

The at least one fibrous mat may be a single fibrous mat of randomly oriented polymeric fibers or multiple mats of randomly oriented polymeric fibers.

In one embodiment, the at least one fibrous mat of randomly oriented polymeric fibers is one fibrous mat of randomly oriented polymeric fibers. FIG. 1 illustrates an embodiment where the at least one fibrous mat is made of one fibrous mat of randomly oriented polymeric fibers. As shown in FIG. 1, in such embodiment, the polymeric filtration medium 10 is made of one nonwoven fiber mat 12 in the form of a flat sheet having a major upper surface 14 and a major lower surface 16. When used in filtration, a fluid stream to be filtered contacts the major upper surface 14, passes through the nonwoven fiber mat 12 that traps solid particulates from the fluid stream, and exits the nonwoven fiber mat 12 at the major lower surface 16.

Figure 2:
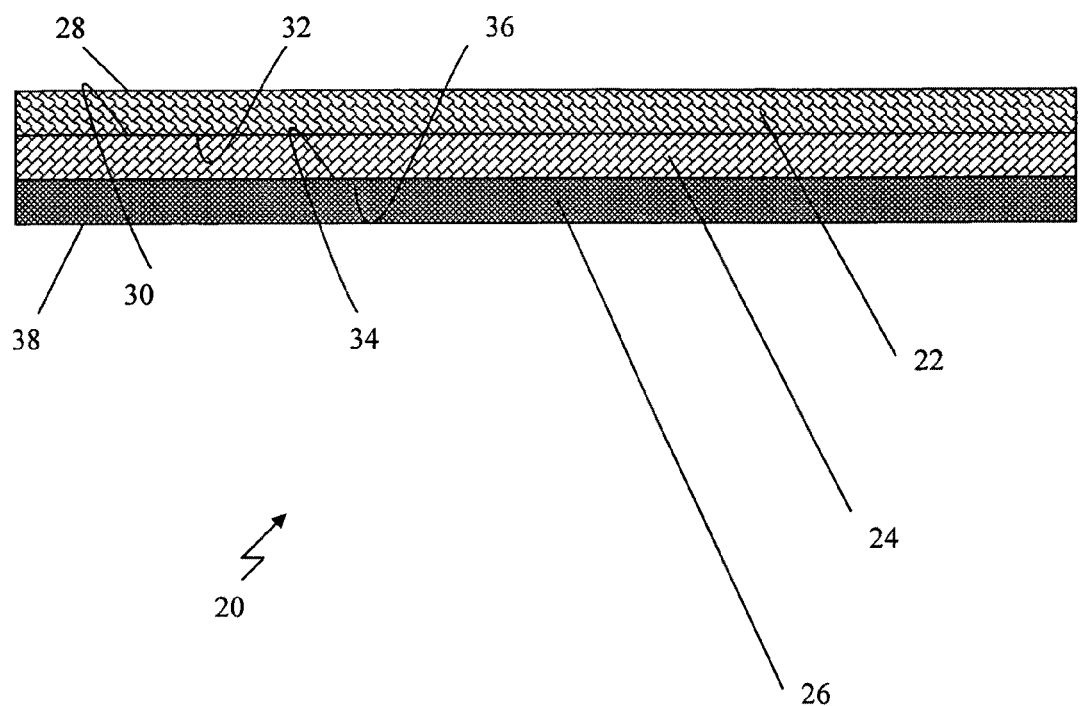
FIG. 2 shows a cross sectional view through a polymeric filtration medium disclosed herein comprised of multiple fibrous mats of randomly oriented polymeric fibers.

In another embodiment, the at least one fibrous mat of randomly oriented polymeric fibers is between 2 and 10 fibrous mats of randomly oriented polymeric fibers. FIG. 2 illustrates an embodiment where the at least one fibrous mat is made of three fibrous mats of randomly oriented polymeric fibers. As shown in FIG. 2, in such embodiment, the polymeric filtration medium 20 is made of a first nonwoven fiber mat 22, a second nonwoven fiber mat 24, and a third nonwoven fiber mat 26. The nonwoven fiber mats 22, 24, 26 are in the form of flat sheets, each having a major upper surface and a major lower surface. As such, the first nonwoven fiber mat 22 has a first major upper surface 28 and first major lower surface 30. The second nonwoven fiber mat 24 has a second major upper surface 32 and a second major lower surface 34. The third nonwoven fiber mat 26 has a third major upper surface 36 and a third major lower surface 38. The first major lower surface 30 is bonded to the second major upper surface 32. Likewise, the second major lower surface 34 is bonded to the third major upper surface 36. When used in filtration, a fluid stream to be filtered contacts the first major upper surface 28 of the first nonwoven fiber mat 22, passes through the nonwoven fiber mats 22, 24, 26 that trap solid particulates from the fluid stream, and exits the third major lower surface 38 of the third nonwoven fiber mat 26.

When the at least one fibrous mat is multiple fibrous mats, the compression step serves to bond the fibrous mats together into an integral structure.

The fiber diameter and the fiber diameter distribution of the polymeric fibers can vary. With regard to average fiber diameter, in one embodiment, the average fiber diameter is between about 0.7 µm and about 2.5 µm, for example, between about 1 µm and about 2.5 µm. In another embodiment, the average fiber diameter is between about 1.2 µm and about 2 µm. In yet another embodiment, the average fiber diameter is between about 1.3 μm and about 1.5 μm, for example, the average fiber diameter may be about 1.4 μm. With regard to fiber diameter distribution, in one embodiment, between about 20% and about 80%, for example, between about 20% and about 45%, of the polymeric fibers have a diameter ≦1 μm. In another embodiment, between about 30% and about 45% of the polymeric fibers have a diameter ≦1 μm. In a further embodiment, between about 35% and about 45% of the polymeric fibers have a diameter ≦1 μm. In yet another embodiment, between about 38% and about 45%, for example, between about 40% and about 43%, of the polymeric fibers have a diameter ≦1 μm.

According to a particular embodiment, the polymeric fibers in the at least one fibrous mat have an average diameter of about 1.4 μm and between about 41% and about 42% of the polymeric fibers have a diameter ≦1 μm.

The polymeric filtration medium made from the at least one mat of randomly oriented polymeric fibers is useful for filtering solid particulates from fluids. As discussed above, the polymeric filtration medium has exceptional filtration efficiency, especially for submicron particles. In fact, the fluid filtration efficiency obtainable is as high as the efficiencies of polymer membranes used in microfiltration. Accordingly, the polymeric filtration medium is advantageous because it can replace a polymer membrane in microfiltration.

In one embodiment, the at least one fibrous mat of randomly oriented polymeric fibers filters 0.7 μm diameter particles in fluids at an efficiency of at least 90%. In one embodiment, the at least one fibrous mat of randomly oriented polymeric fibers filters 1 μm diameter particles in fluids at an efficiency of at least 98%. In an embodiment, the at least one fibrous mat of randomly oriented polymeric fibers filters 0.8 μm diameter particles in fluids at an efficiency as high as 99.7%.

As discussed above, the polymer used in the method of making a polymeric filtration medium disclosed herein has a molecular weight distribution ($M_w/M_n$) between about 1.4 and about 6 and a melt flow rate of greater than about 1000 g/10 minutes. Such a polymer may be made by metallocene catalyzed olefin polymerization, which is well known in the art. Thus, the polymer can be, but is not limited to, a polypropylene polymer produced by a metallocene catalyzed polymerization process. Exemplary polypropylene polymers are ACHIEVE™ 6936G produced by ExxonMobil and Metocene MF650Y produced by Lyondell Basell Industries.

The method of making a polymeric filtration medium disclosed herein can produce filtration cartridges that are easy to recycle. If the polymer is a polypropylene polymer, all polypropylene (i.e. housing and polymeric filtration medium) filtration cartridges can be produced. Such filtration cartridges are easier to recycle than filtration cartridges containing a polymer membrane made of a polymer other than a polypropylene polymer (e.g. polyethersulphone) and a housing made of a polypropylene polymer.

The polymeric filtration medium made by the method disclosed herein can be advantageous over melt blown nonwovens made with medium viscosity polypropylene polymers. Melt blown nonwovens can be made with medium viscosity polypropylene polymers, which have a relatively large molecular weight distribution. During extrusion, organic peroxides are coated on or added to these medium viscosity polypropylene polymers to chemically degrade the polymers by a process known as chemical visbreaking. Due to their relatively large molecular weight distribution, the polymers include both long polymer chains and short polymer chains. The organic peroxides split both the long polymer chains and the short polymer chains into shorter pieces thereby reducing the viscosity of the polymers, which enables the production of finer fibers. However, the organic peroxides split the short polymer chains into very short chains, which forms waxes and residues. The waxes and residues are undesired decomposition by-products that make the melt blown nonwovens unsuitable for food contact.

In contrast, the high melt flow rate of the polymer used herein allows for the production of a polymeric filtration medium suitable for food contact. Since the melt flow rate of the polymer used in the present method is high, organic peroxides need not be used during the melt blown process. As such, the undesired waxes and residues from the organic peroxides are not created in the present method. Accordingly, the polymeric filtration medium may be suitable for food contact. In particular, the polymeric filtration medium can be certified for food contact under 21 C.F.R. and certified for biological compatibility under USP Class VI.

Food contact certification is required for beverage filtration (e.g. filtration of beer, wine, juices, and water), water filtration for drug preparation, and drug filtration. Accordingly, the polymeric filtration medium may be implemented in beverage filtration, water filtration for drug preparation, and drug filtration.

In one embodiment of the method disclosed herein, the orifices are 0.010" in diameter and the die comprises 50 orifices per inch.

Polymeric Filtration Medium

Also disclosed herein is a polymeric filtration medium that may be made by the method disclosed herein. The polymeric filtration medium comprises at least one fibrous mat of randomly oriented fibers of a polymer. The polymer has a molecular weight distribution ($M_w/M_n$) between about 1.4 and about 6 and a melt flow rate greater than about 1000 g/10 minutes.

The molecular weight distribution may vary within the range of between about 1.4 and about 6. In one embodiment, the molecular weight distribution is between about 1.4 and about 4. In another embodiment, the molecular weight distribution is between about 1.5 and about 1.6.

The melt flow rate may vary within the range of greater than about 1000 g/10 minutes. In one embodiment, the melt flow rate is at least 1500 g/10 minutes. In another embodiment, the melt flow rate is at least 1800 g/10 minutes.

Since the polymeric filtration medium may be made by the method disclosed herein, the properties discussed above in regard to the at least one fibrous mat of randomly oriented polymeric fibers made by the method can also apply to the at least one fibrous mat of randomly oriented polymeric fibers of the polymeric filtration medium. Similarly, the properties discussed in regard to the at least one fibrous mat of randomly oriented polymeric fibers of the polymeric filtration medium can also apply to the at least one fibrous mat of randomly oriented polymeric fibers made by the method.

Therefore, in one embodiment, the polymeric fibers have an average diameter between about 0.7 μm and about 2.5 μm and between about 20% and about 80% of the polymeric fibers have a diameter ≦1 μm.

In another embodiment of the polymeric filtration medium, the polymer is polypropylene polymer made by a metallocene catalyzed polymerization process.

In another embodiment, the at least one fibrous mat of randomly oriented polymeric fibers is between 2 and 10 fibrous mats of randomly oriented polymeric fibers that have been compressed together. In yet another embodiment, the at least one fibrous mat of randomly oriented polymeric fibers is one fibrous mat of randomly oriented polymeric fibers that has been compressed.

As discussed above, the polymeric filtration medium can exhibit exceptional fluid filtration efficiency. In one embodiment, the polymeric filtration medium filters 0.7 μm diameter particles in fluids at an efficiency of at least 90%. In one embodiment, the polymeric filtration medium filters 1 μm diameter particles in fluids at an efficiency of at least 98%. In an embodiment, the at least one fibrous mat of randomly oriented polymeric fibers filters 0.8 μm diameter particles in fluids at an efficiency as high as 99.7%.

Also, as discussed above, the polymeric filtration medium may be suitable for food contact.

Generally, the polymeric filtration medium is substantially uniform in density and thickness throughout. The polymeric filtration medium can weigh between about 10 grams per square meter and about 325 grams per square meter, for example, between about 20 and about 200 grams per square meter. Alternatively, the polymeric filtration medium can weigh between about 20 and about 80 grams per square meter. As another alternative, the polymeric filtration medium can weigh between about 30 and about 80 grams per square meter. The polymeric filtration medium can range in thickness from about 0.1 mm to about 4 mm, for example, from about 0.1 mm to about 1 mm. Alternatively, the polymeric filtration medium can range in thickness from about 0.2 mm to about 1 mm. As another alternative, the polymeric filtration medium can range in thickness from about 0.4 mm to about 1 mm. As yet another alterative, the polymeric filtration medium can range in thickness from about 0.5 mm to about 1 mm. For non-calendared products, the thicknesses of the polymeric filtration media set forth in this specification are measured by putting a sample under a 20 cm² foot and applying a pressure of 1.45 kPa using a TMI model 49-72 motorized micrometer. For calendared products, the thicknesses of the polymeric filtration media set forth in this specification are measured by putting a sample under a 2 cm² foot and applying a pressure of 50 kPa using a TMI model 49-70 motorized micrometer.

The polymeric filtration medium can take on various forms. For example, the polymeric filtration medium can be in the form of a flat sheet or can be pleated. As such, the polymeric filtration medium may be utilized in a cartridge filter.

Method of Filtering a Fluid

Further disclosed herein is a method of filtering a fluid with the polymeric filtration medium disclosed herein. The method of filtering a fluid involves filtering a fluid stream through at least one nonwoven fiber mat of randomly oriented fibers of polymer to provide a filtered fluid stream. The polymer has a molecular weight distribution ($M_w/M_n$) between about 1.4 and about 6 and a melt flow rate greater than about 1000 g/10 minutes.

As discussed above, the polymeric filtration medium is useful for filtering solid particulates from fluids. As defined above, fluids include both liquids and gases, including mixtures of liquids and gaseous mixtures. Accordingly, in one embodiment of the present filtration method, the fluid is a liquid or a mixture of liquids. In another embodiment, the fluid is a gas or a gaseous mixture. The gaseous mixture can be air.

As discussed above, the polymeric fibers can have an average diameter between about 0.7 μm and about 2.5 μm and between about 20% and about 80% of the polymeric fibers can have a diameter $\leq 1$ μm.

Also, as discussed above, the polymer can be a polypropylene polymer made by a metallocene catalyzed polymerization process.

As with the polymeric filtration medium disclosed herein, the at least one fibrous mat of randomly oriented fibers can be a single mat or multiple mats. Accordingly, in one embodiment of the filtration method disclosed herein, the at least one fibrous mat of randomly oriented polymeric fibers is between 2 and 10 fibrous mats of randomly oriented polymeric fibers that have been compressed together. In another embodiment of the filtration method disclosed herein, the at least one fibrous mat of randomly oriented polymeric fibers is one fibrous mat of randomly oriented polymeric fibers that has been compressed.

As with the polymeric filtration medium and its associated method of making disclosed herein, the filtration method is advantageous because it is capable of achieving high filtration efficiency in fluids, including both liquids and gases, especially at the submicron level. In one embodiment, the filtration step filters 0.7 μm diameter particles in the fluid stream at an efficiency of at least 90%. In one embodiment, the filtration step filters 1 μm diameter particles in the fluid stream at an efficiency of at least 98%. In an embodiment, the filtration step filters 0.8 μm diameter particles in the fluid stream at an efficiency as high as 99.7%.

Moreover, as with the polymeric filtration medium and its associated method of making, the filtration method is advantageous because it may be suitable for use in the food and pharmaceutical industries. Since the polymeric filtration medium may be suitable for food contact, in one embodiment, the filtration method may be implemented in beverage filtration, water filtration for drug preparation, or drug filtration. Exemplary beverages that may be subject to filtration include beer, wine, juices, and water.

Composite Filtration Medium

The polymeric filtration medium disclosed herein can be incorporated into a composite filtration medium. Thus, the present specification is further directed to a composite filtration medium.

Typically, a composite filtration medium is comprised of an upstream dirt holding layer and a downstream filtration layer. In the composite filtration medium disclosed herein, the polymeric filtration medium disclosed herein is used as the upstream dirt holding layer.

More specifically, the composite filtration medium comprises an upstream layer, which comprises at least one nonwoven fiber mat of randomly oriented fibers of a polymer, and a second downstream layer, which comprises at least one polymer membrane. The polymer of the at least one nonwoven fiber mat has a molecular weight distribution ($M_w/M_n$) between about 1.4 and about 6 and a melt flow rate greater than about 1000 g/10 minutes. The second downstream layer is bonded to the first upstream layer to form an integral composite filtration medium.

The second downstream layer is preferably bonded to the first upstream layer with heat. For example, the layers may be bonded together by calendaring. Alternatively, the layers may be bonded to each other merely by compression.

The composite filtration medium disclosed herein represents an improvement over currently available composite filtration media due to the fact that the polymeric filtration medium disclosed herein is used as the first upstream layer. Since the polymeric filtration medium can exhibit increased efficiency in fluid filtration, the first upstream layer can exhibit increased efficiency in fluid filtration. This increased efficiency ensures that the solid particulates being filtered do not prematurely clog the least one polymer membrane of the second downstream layer. Accordingly, the increased efficiency increases the life of the composite filtration medium.

Figure 3:
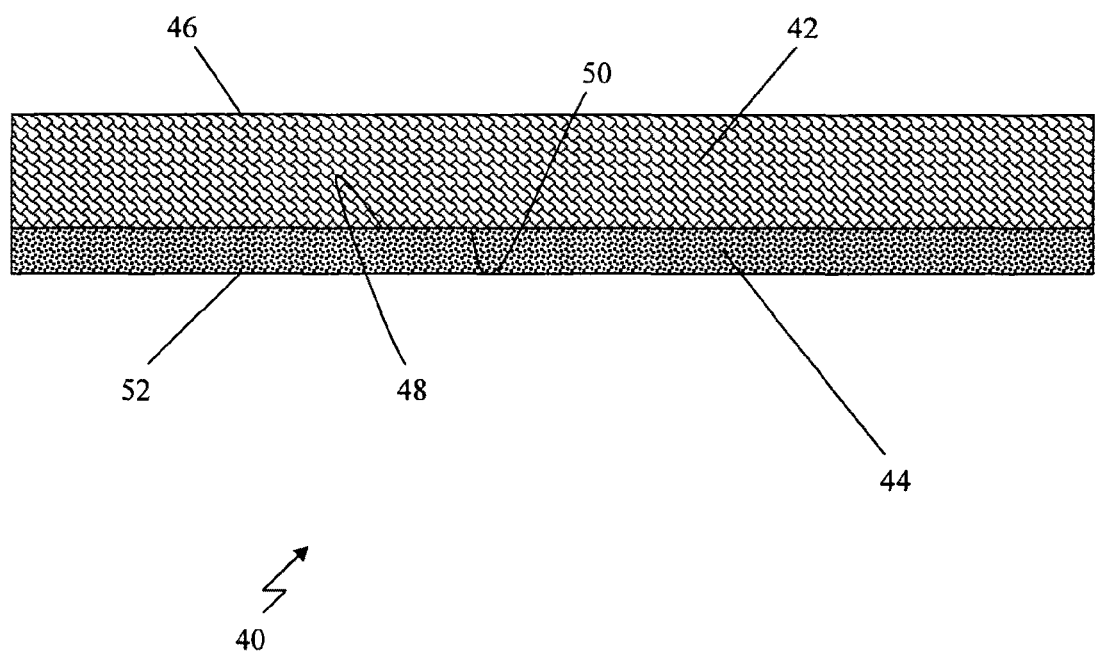
FIG. 3 shows a cross sectional view through a composite filtration medium disclosed herein.

FIG. 3 illustrates an embodiment of the composite filtration medium disclosed herein. As shown in FIG. 3, the composite filtration medium 40 includes a first upstream layer 42 of the at least one nonwoven fiber mat of randomly oriented fibers of a polymer. The composite filter medium 40 additionally includes a second downstream layer 44 of at least one polymer membrane. The fluid (e.g. air) being filtered passes into the composite filtration medium 40 through a major upstream surface 46 of the first upstream layer 42 and exits the composite filter medium 40 through a major downstream surface 52 of the second downstream layer 44. A major downstream surface 48 of the first upstream layer 42 and a major upstream surface 50 of the second downstream layer 44 are bonded or otherwise secured together.

Polymer membranes are well known in the art. They can be made by well known techniques such as suspension deposition. Accordingly, using the method of making a polymeric filtration medium disclosed herein and well known techniques for making polymer membranes, one of ordinary skill in the art could readily make the composite filtration medium.

In one embodiment of the composite filtration medium, the polymeric fibers have an average diameter between about 0.7 µm and about 2.5 µm and between about 20% and about 80% of the polymeric fibers have a diameter ≦1 µm.

As with the polymeric filtration medium disclosed herein, the composite filtration medium can take on various forms. For example, the composite filtration medium can be in the form of a flat sheet or can be pleated. As such, the composite filtration medium may be utilized in a cartridge filter.

Filtration Applications

The polymeric filtration medium and the composite filtration medium may be utilized for separating solid particulates, including submicron solid particulates, from fluids. For example, they are suitable for air filtration applications, such as commercial HVAC, automotive cabin air filtration and engine air filtration. As such, they may be used as allergen barriers. As another example, they are suitable for liquid filtration applications. Exemplary liquid filtration applications include filtration of food and beverages, filtration of water for drug preparation, and drug filtration.

The following examples are provided to further illustrate the present methods and filtration media and advantages thereof. The examples are meant to be only illustrative, and not limiting.

EXAMPLES

Example 1

Production of Non-Calendared and Calendared Polymeric Filtration Media

This Example describes the production of non-calendared and calendared polymeric filtration media tested in subsequent Examples.

The polymers listed in Table 1 below (New-1, New-2, and Reference) were used to make non-calendared polymeric filtration media (Product-1, Product-2a, Product-2b, Product 3, and Product-4) and calendared polymeric filtration media (Product-5 and Product-6). Polymeric filtration media made with New-1 or New-2 are polymeric filtration media as disclosed herein. Polymeric filtration media made with Reference are comparative filtration media.

TABLE 1

Polymers

| Polymer | Producer | Product code | Target MFR | $M_w/M_n$ | Production process |
|---|---|---|---|---|---|
| Reference | ExxonMobil | PP3546G | 1200 | Typically >6 | Ziegler-Natta catalyzed polymerization, peroxide controlled rheology |
| New-1 | ExxonMobil | Achieve 6936G | 1550 | Typically <4 | Metallocene catalyzed polymerization |
| New-2 | Lyondell Basell Industries | Metocene MF650Y | 1800 | 1.5-1.6 | Metallocene catalyzed polymerization |

The polymers were melt-blown on three different melt-blowing production lines (A, B, and C), each equipped with a single screw Davis Standard extruder and a melt pump. Line A had a 3.5" diameter screw with a L/D ratio of 30. Line B also had a 3.5" diameter screw with a L/D ratio of 30. Line C had a 2" diameter screw with a L/D ratio of 40. Each line was equipped with a flat die of 64 inches having die holes with a diameter of 0.010" and 50 holes per inch.

The production settings listed in Table 2 below were used to produce the non-calendared polymeric filtration media.

TABLE 2

Production settings for non-calendared polymeric filtration media

| | Product-1 | Product-2a | Product-2b | Product-3 | Product-4 |
|---|---|---|---|---|---|
| Production line | A | B | C | C | C |
| Output (lbs/hr) | 140 | 100 | 70 | 54 | 57 |
| Melt temperature (° F.) | 450 | 490 | 488 | 490 | 490 |
| Air temperature (° F.) | 510 | 530 | 595 | 588 | 590 |
| Exhaust fan speed (%) | 100 | 100 | 97 | 84 | 83 |
| Die-collector distance (inches) | 7 | 13 | 11.5 | 8.76 | 10.4 |
| Take-up speed (fpm) | 151 | 227 | 31 | 55 | 57 |

For each product in Table 2, Reference was melt-blown. The non-calendared polymeric filtration media produced with Reference were first brought into specification. Once the specifications were reached, three rolls were produced. For Product-1, Product-2a, and Product-2b, 3 rolls were produced at 150 fpm for 30 minutes each. For Product-3 and Product-4, 3 rolls of 2000 ft were produced. Samples of each roll were taken and properties (weight and thickness) were measured following standard quality assurance procedure.

For each product in Table 2, New-1 and/or New-2 were melt-blown using the same settings except for the take-up speed, which was adjusted to keep the nonwoven weight in specification.

The target weight and thickness of the non-calendared polymeric filtration media are listed in Table 3 below.

TABLE 3

Target weight and thickness for non-calendared polymeric filtration media

| Product | Target weight (gsm) | Target thickness (mm) |
|---|---|---|
| Product-1 | 20.6 | 0.14 |
| Product-2a | 37.5 | 1.00 |
| Product-2b | 37.5 | 1.00 |
| Product-3 | 21.0 | 0.40 |
| Product-4 | 27.1 | 0.54 |

Product-5 and Product-6 were produced by calendaring Product-3 and Product-4. Product-5 was produced by calendaring 4 layers of Product-3 or 3 layers or Product-4. Product-6 was produced by calendaring 2 layers of Product-3 or 4 layers of Product-4. Product-3 and Product-4 were calendared on an in-house built hot roll calendar with 6 unwinding stations. The calendaring process was temperature-controlled with hot oil and was pressure-controlled with hydraulic cylinders.

The production settings listed in Table 4 below were used to produce the calendared polymeric filtration media.

TABLE 4

Production settings for calendared polymeric filtration media

|  | Product-5 | Product-6 |
|---|---|---|
| Production line | A | A |
| Roll temperature (° F.) | 285 | 298 |
| Hydraulic pressure right (psi) | 2500 | 7300 |
| Hydraulic pressure left (psi) | 3100 | 7900 |

The target weight and thickness of the calendared polymeric filtration media are listed in Table 5 below.

TABLE 5

Target weight and thickness for calendared polymeric filtration media

| Product | Target weight (gsm) | Target thickness (mm) |
|---|---|---|
| Product-5 | 79.5 | 0.152 |
| Product-6 | 153.0 | 0.228 |

Example 2

Testing Procedures for Air Permeability, Bubble Point, Mean Flow Pore, and Average Fiber Diameter/Fiber Diameter Distribution The non-calendared polymeric filtration media were tested to ascertain at least one of the following properties: air permeability, bubble point, mean flow pore, and average fiber diameter/fiber diameter distribution.

Air permeability was measured using a TexTest Air Permeability Tester model FX3300 following ASTM standard DD737-75 for air permeability of textile fabrics. For the non-calendared products, between 4 and 8 samples were taken, equally spaced across the width. For the calendared products, 3 samples were taken from the middle of the web, at intervals of 10-12 inches.

Bubble point was measured on a 2 inch diameter sample covered with isopropyl alcohol. A pressurized air stream was gradually applied from the bottom of the clamped-in sample and the pressure at which a third stream of bubbles developed was determined.

Mean flow pore and bubble point, as an auxiliary data point, were determined using a PMI CFP-1100AQC or CFP-1100A capillary flow porometer. The porous materials built-in testing procedure was followed. For non-calendared products, one sample was taken to determine the mean flow pore. For calendared products, 3 samples were taken to determine the bubble point, as an auxiliary data point.

Average fiber diameter and fiber diameter distribution were determined using Scanning Electron Microscopy (SEM). SEM photographs of the samples were taken and, using high resolution, the diameters of 200 fibers were measured. The average and standard deviation of the fiber diameter data were calculated and reported using a normal distribution. The fiber diameter distribution was represented in a histogram.

Example 3

Average Fiber Diameter/Fiber Diameter Distribution for Product-1 Made From Reference and Product-1 Made From New-1

Product-1 (made from Reference) and Product-1 (made from New-1) were tested to ascertain average fiber diameter and fiber diameter distribution. The average fiber diameters for both Product-1 (made from Reference) and Product-1 (made from New-1) are listed in Table 6 below.

TABLE 6

Average fiber diameter for Product-1

| Polymer | Average fiber diameter (μm) | Change in diameter |
|---|---|---|
| Reference | 3.26 | |
| New-1 | 2.05 | −37% |

As shown in Table 6, the average fiber diameter of Product-1 (made from New-1) was 37% less than the average fiber diameter of Product-1 (made from Reference). A decrease in average fiber diameter corresponds to an increase in filtration efficiency. Accordingly, Table 6 demonstrates that Product-1 (made from New-1), a polymeric filtration medium disclosed herein, exhibits increased filtration efficiency compared to Product-1 (made from Reference).

Figure 4:
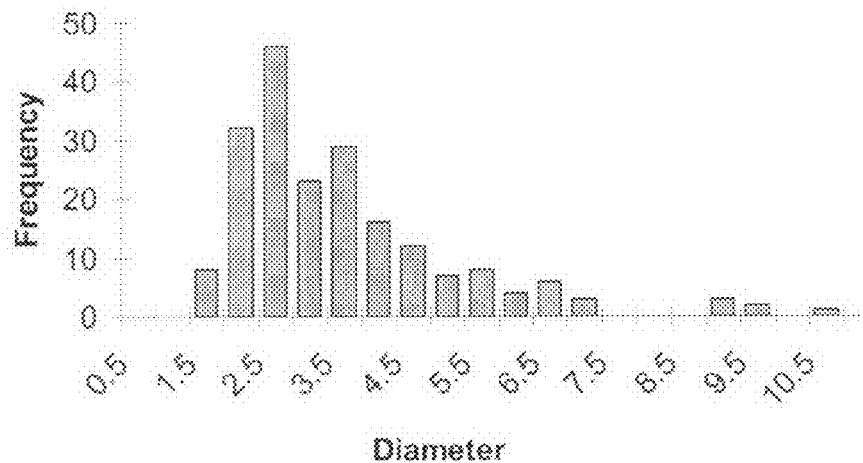
FIG. 4 illustrates the fiber diameter distribution of Product-1 (made from Reference) discussed in Example 3.
Figure 5:
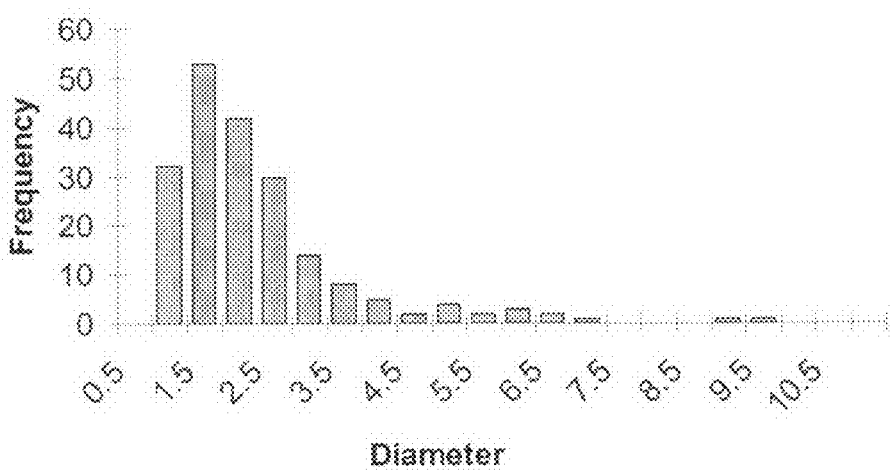
FIG. 5 illustrates the fiber diameter distribution of Product-1 (made from New-1) discussed in Example 3.

FIGS. 4 and 5 show the fiber diameter distributions of Product-1 (made from Reference) and Product-1 (made from New-1), respectively. The fiber diameter distribution of Product-1 (made from New-1) is shifted to the left as compared to the fiber diameter distribution of Product-1 (made from Reference). Such a shift corresponds to the decrease in average fiber diameter. As discussed above, a decrease in average fiber diameter corresponds to an increase in filtration efficiency. Accordingly, the shift in fiber diameter distribution further demonstrates that Product-1 (made from New-1), a polymeric filtration medium disclosed herein, exhibits increased filtration efficiency compared to Product-1 (made from Reference).

Example 4

Average Fiber Diameter/Fiber Diameter Distribution for Product-2a Made From Reference and Product-2a Made From New-1

Product-2a (made from Reference) and Product-2a (made from New-1) were tested to ascertain average fiber diameter and fiber diameter distribution. The average fiber diameters for both Product-2a (made from Reference) and Product-2a (made from New-1) are listed in Table 7 below.

TABLE 7

Average fiber diameter for Product-2a

| Polymer | Average fiber diameter (μm) | Change in fiber diameter |
|---|---|---|
| Reference | 1.95 | |
| New-1 | 1.46 | −25% |

As shown in Table 7, the average fiber diameter of Product-2a (made from New-1) was 25% less than the average fiber diameter of Product-2a (made from Reference). A decrease in average fiber diameter corresponds to an increase in filtration efficiency. Accordingly, Table 7 demonstrates that Product-2a (made from New-1), a polymeric filtration medium disclosed herein, exhibits increased filtration efficiency compared to Product-2a (made from Reference).

Figure 6:
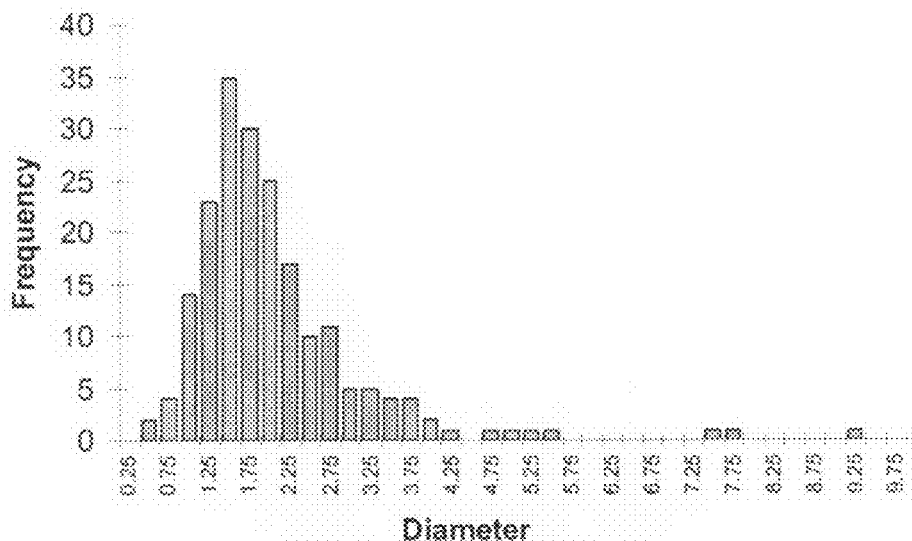
FIG. 6 illustrates the fiber diameter distribution of Product-2a (made from Reference) discussed in Example 4.
Figure 7:
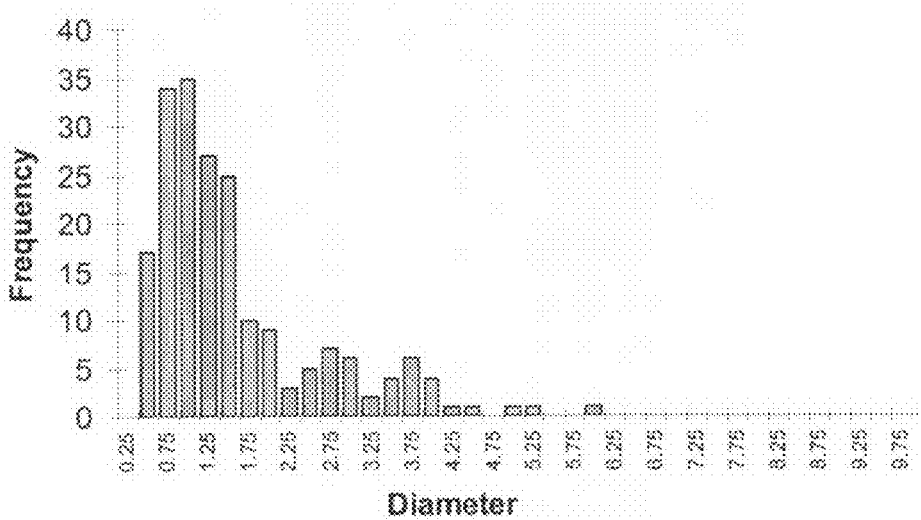
FIG. 7 illustrates the fiber diameter distribution of Product-2a (made from New-1) discussed in Example 4.

FIGS. 6 and 7 show the fiber diameter distributions of Product-2a (made from Reference) and Product-2a (made from New-1), respectively. The fiber diameter distribution of Product-2a (made from New-1) is shifted to the left as compared to the fiber diameter distribution of Product-2a (made from Reference). Such a shift corresponds to the decrease in average fiber diameter. As discussed above, a decrease in average fiber diameter corresponds to an increase in filtration efficiency. Accordingly, the shift in fiber diameter distribution further demonstrates that Product-2a (made from New-1), a polymeric filtration medium disclosed herein, exhibits increased filtration efficiency compared to Product-2a (made from Reference).

Example 5

Air Permeability, Bubble Point, Mean Flow Pore, and Average Fiber Diameter/Fiber Diameter Distribution for Product-2b Made From Reference, Product-2b Made From New-1, and Product-2b Made From New-2

Product-2b (made from Reference), Product-2b (made from New-1), and Product-2b (made from New-2) were tested to ascertain air permeability, bubble point, mean flow pore, average fiber diameter, and fiber diameter distribution. The air permeabilities for Product-2b (made from Reference), Product-2b (made from New-1), and Product-2b (made from New-2) are listed in Table 8 below. The bubble points for Product-2b (made from Reference), Product-2b (made from New-1), and Product-2b (made from New-2) are listed in Table 9 below. The mean flow pores for Product-2b (made form Reference), Product-2b (made from New-1), and Product-2b (made from New-2) are listed in Table 10 below. The average fiber diameters for Product-2b (made from Reference), Product-2b (made form New-1), and Product-2b (made from New-2) are listed in Table 11 below.

TABLE 8

Air permeability for Product-2b

| Polymer | Air permeability (CFM) | Change in air permeability |
|---|---|---|
| Reference | 38.4 | |
| New-1 | 34.8 | −9% |
| New-2 | 31.8 | −17% |

TABLE 9

Bubble point for Product-2b

| Polymer | Bubble point (inches $H_2O$) | Change in bubble point |
|---|---|---|
| Reference | 20.3 | |
| New-1 | 22.9 | +13% |
| New-2 | 22.3 | +10% |

TABLE 10

Mean flow pore for Product-2b

| Polymer | Mean flow pore (μm) | Change in mean flow pore |
|---|---|---|
| Reference | 9.067 | |
| New-1 | 7.894 | −13% |
| New-2 | 8.246 | −9% |

TABLE 11

Average fiber diameter for Product-2b

| Polymer | Average fiber diameter (μm) | Change in fiber diameter |
|---|---|---|
| Reference | 1.80 | |
| New-1 | 1.35 | −25% |
| New-2 | 1.64 | −8% |

As shown in Table 8, the air permeability of Product-2b (made from New-1) was 9% less than the air permeability of Product-2b (made from Reference) and the air permeability of Product-2b (made from New-2) was 17% less than the air permeability of Product-2b (made from Reference). A decrease in air permeability corresponds to an increase in filtration efficiency. Accordingly, Table 8 demonstrates that both Product-2b (made from New-1) and Product-2b (made from New-2), polymeric filtration media disclosed herein, exhibit increased filtration efficiencies compared to Product-2b (made from Reference).

As shown in Table 9, the bubble point of Product-2b (made from New-1) was 13% greater than the bubble point of Product-2b (made from Reference) and the bubble point of Product-2b (made from New-2) was 10% greater than the bubble point of Product-2b (made from Reference). An increase in bubble point corresponds to an increase in filtration efficiency. Accordingly, Table 9 demonstrates that both Product-2b (made from New-1) and Product-2b (made from New-2), polymeric filtration media disclosed herein, exhibit increased filtration efficiencies compared to Product-2b (made from Reference).

As shown in Table 10, the mean flow pore of Product-2b (made from New-1) was 13% less than the mean flow pore of Product-2b (made from Reference) and the mean flow pore of Product-2b (made from New-2) was 9% less than the mean flow pore of Product-2b (made from Reference). A decrease in mean flow pore corresponds to an increase in filtration efficiency. Accordingly, Table 10 demonstrates that both Product-2b (made from New-1) and Product-2b (made from New-2), polymeric filtration media disclosed herein, exhibit increased filtration efficiencies compared to Product-2b (made from Reference).

As shown in Table 11, the average fiber diameter of Product-2b (made from New-1) was 25% less than the average fiber diameter of Product-2b (made from Reference) and the average fiber diameter of Product-2b (made from New-2) was 8% less than the average fiber diameter of Product-2b (made from Reference). A decrease in average fiber diameter corresponds to an increase in filtration efficiency. Accordingly, Table 11 demonstrates that both Product-2b (made from New-1) and Product-2b (made from New-2), polymeric filtration media disclosed herein, exhibit increased filtration efficiencies compared to Product-2b (made from Reference).

Figure 8:
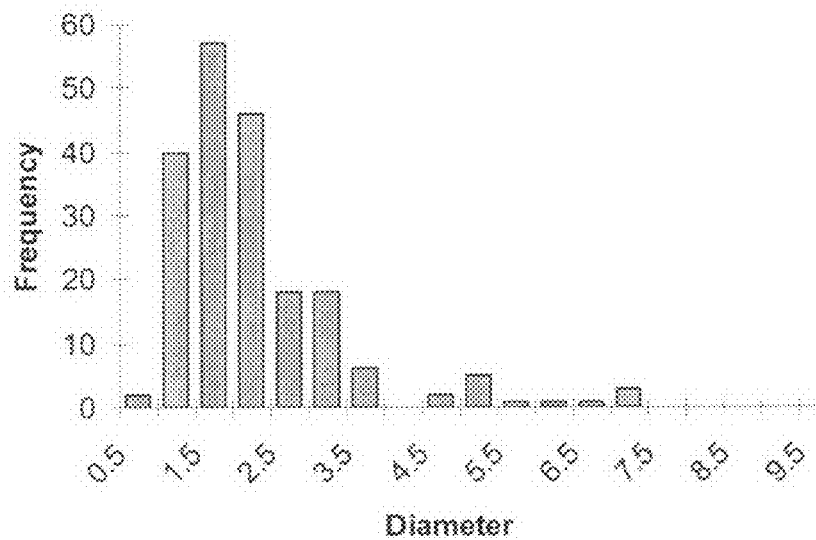
FIG. 8 illustrates the fiber diameter distribution of Product-2b (made from Reference) discussed in Example 5.
Figure 9:
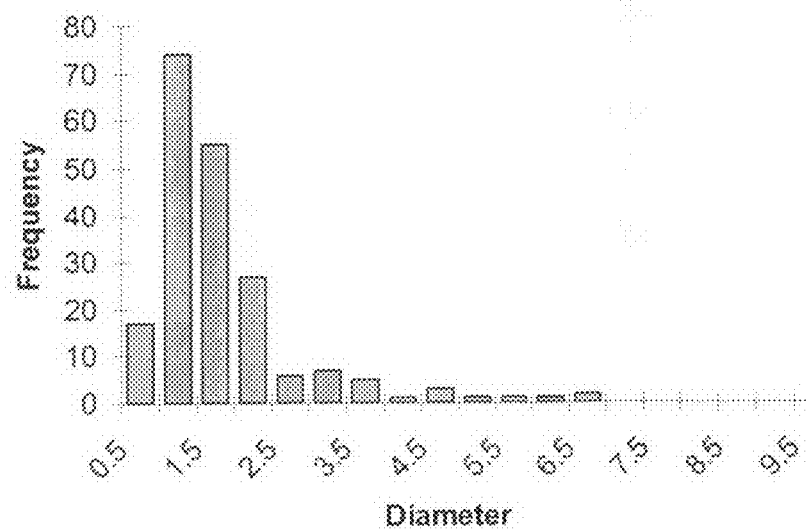
FIG. 9 illustrates the fiber diameter distribution of Product-2b (made from New-1) discussed in Example 5.
Figure 10:
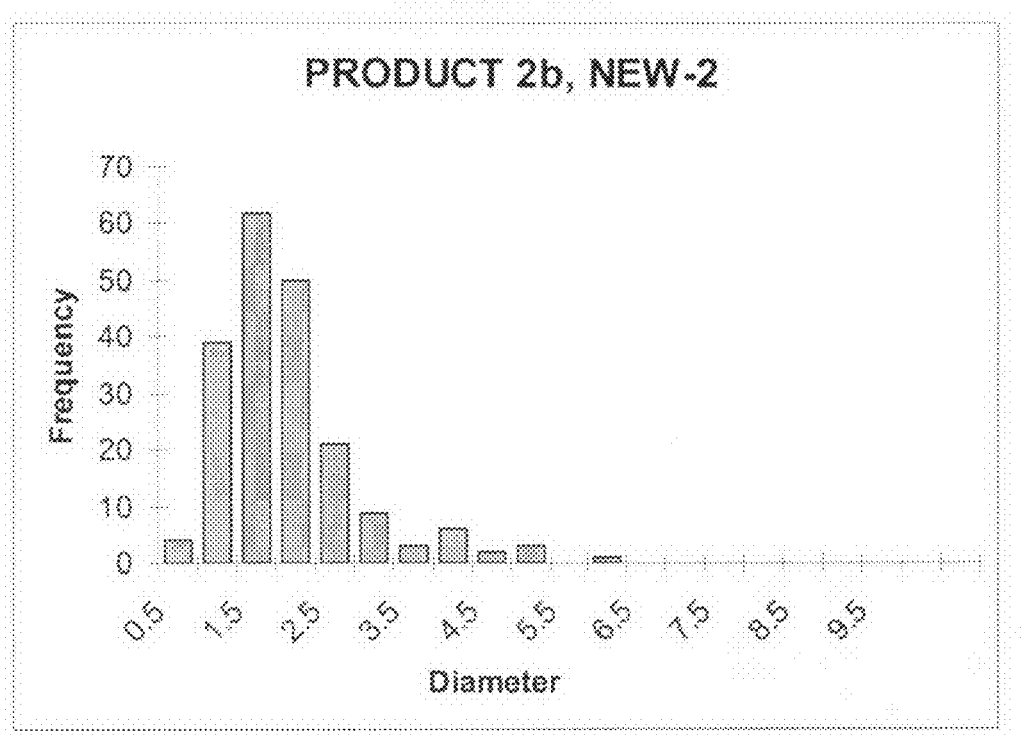
FIG. 10 illustrates the fiber diameter distribution of Product-2b (made from New-2) discussed in Example 5.

FIGS. 8, 9, and 10 show the fiber diameter distributions of Product-2b (made from Reference), Product-2b (made from New-1), and Product-2b (made from New-2), respectively. The fiber diameter distributions of Product-2b (made from New-1) and Product-2b (made from New-2) are shifted to the left as compared to the fiber diameter distribution of Product-2b (made from Reference). Such shifts correspond to decreases in average fiber diameter. As discussed above, a decrease in average fiber diameter corresponds to an increase in filtration efficiency. Accordingly, the shifts in fiber diameter distribution further demonstrate that both Product-2b (made from New-1) and Product-2b (made from New-2), polymeric filtration media disclosed herein, exhibit increased filtration efficiencies compared to Product-2b (made from Reference).

Example 6

Air Permeability and Mean Flow Pore for Product-3 Made From Reference, Product-3 Made From New-1, and Product-3 Made From New-2

Product-3 (made from Reference), Product-3 (made from New-1), and Product-3 (made from New-2) were tested to ascertain air permeability and mean flow pore. The air permeabilities and mean flow pores for Product-3 (made from Reference), Product-3 (made from New-1), and Product-3 (made from New-2) are listed in Tables 12 and 13, respectively, below.

TABLE 12

| Air permeability for Product-3 | | |
| --- | --- | --- |
| Polymer | Air permeability (CFM) | Change in air permeability |
| Reference | 58.0 | |
| New-1 | 47.3 | −19% |
| New-2 | 47.9 | −17% |

TABLE 13

| Mean flow pore for Product-3 | | |
| --- | --- | --- |
| Polymer | Mean flow pore (μm) | Change in mean flow pore |
| Reference | 10.786 | |
| New-1 | 7.969 | −26% |
| New-2 | 7.855 | −27% |

As shown in Table 12, the air permeability of Product-3 (made from New-1) was 19% less than the air permeability of Product-3 (made from Reference) and the air permeability of Product-3 (made from New-2) was 17% less than the air permeability of Product-3 (made from Reference). A decrease in air permeability corresponds to an increase in filtration efficiency. Accordingly, Table 12 demonstrates that both Product-3 (made from New-1) and Product-3 (made from New-2), polymeric filtration media disclosed herein, exhibit increased filtration efficiencies compared to Product-3 (made from Reference).

As shown in Table 13, the mean flow pore of Product-3 (made from New-1) was 26% less than the mean flow pore of Product-3 (made from Reference) and the mean flow pore of Product-3 (made from New-2) was 27% less than the mean flow pore of Product-3 (made from Reference). A decrease in mean flow pore corresponds to an increase in filtration efficiency. Accordingly, Table 13 demonstrates that both Product-3 (made from New-1) and Product-3 (made from New-2), polymeric filtration media disclosed herein, exhibit increased filtration efficiencies compared to Product-3 (made from Reference).

Example 7

Mean Flow Pore for Product 4 (Made From Reference), Product-4 (Made From New-1), and Product-4 (Made From New-2)

Product-4 (made from Reference), Product-4 (made from New-1), and Product-4 (made from New-2) were tested to ascertain mean flow pore. Mean flow pores for Product-4 (made from Reference), Product4 (made from New-1), and Product4 (made from New-2) are listed in Table 14 below.

TABLE 14

| Mean flow pore for Product-4 | | |
| --- | --- | --- |
| Polymer | Mean flow pore (μm) | Change in mean flow pore |
| Reference | 10.500 | |
| New-1 | 8.890 | −15% |
| New-2 | 9.065 | −14% |

As shown in Table 14, the mean flow pore of Product-4 (made from New-1) was 15% less than the mean flow pore of Product4 (made from Reference) and the mean flow pore of Product-4 (made from New-2) was 14% less than the mean flow pore of Product-4 (made from Reference). A decrease in mean flow pore corresponds to an increase in filtration efficiency. Accordingly, Table 14 demonstrates that both Product-4 (made from New-1) and Product-4 (made from New-2), polymeric filtration media disclosed herein, exhibit increased filtration efficiencies compared to Product-4 (made from Reference).

Example 8

Air Permeability, Bubble Point, and Mean Flow Pore for Product-5 (Made From Reference), Product-5 (Made From New-1), and Product-5 (Made From New-2)

Product-5 (made from Reference), Product-5 (made from New-1), and Product-5 (made from New-2) were tested to ascertain air permeability, bubble point, and mean flow pore. The air permeabilities for Product-5 (made from Reference), Product-5 (made from New-1), and Product-5 (made from New-2) are listed in Table 15 below. The bubble points for Product-5 (made from Reference), Product-5 (made from New-1), and Product-5 (made from New-2) are listed in Table 16 below. The mean flow pores for Product-5 (made form Reference), Product-5 (made from New-1), and Product-5 (made from New-2) are listed in Table 17 below.

TABLE 15

Air permeability for Product-5

| Polymer | Air permeability (CFM) | Change in air permeability |
|---|---|---|
| Reference | 0.177 | |
| New-1 | 0.130 | −27% |
| New-2 | 0.123 | −31% |

TABLE 16

Bubble point for Product-5

| Polymer | Bubble point (inches H$_2$O) | Change in bubble point |
|---|---|---|
| Reference | 74.0 | |
| New-1 | 80.7 | +9% |
| New-2 | 86.5 | +17% |

TABLE 17

Mean flow pore for Product-5

| Polymer | Mean flow pore (μm) | Change in mean flow pore |
|---|---|---|
| Reference | 0.973 | |
| New-1 | 0.787 | −19% |
| New-2 | 0.806 | −17% |

As shown in Table 15, the air permeability of Product-5 (made from New-1) was 27% less than the air permeability of Product-5 (made from Reference) and the air permeability of Product-5 (made from New-2) was 31% less than the air permeability of Product-5 (made from Reference). A decrease in air permeability corresponds to an increase in filtration efficiency. Accordingly, Table 15 demonstrates that both Product-5 (made from New-1) and Product-5 (made from New-2), polymeric filtration media disclosed herein, exhibit increased filtration efficiencies compared to Product-5 (made from Reference).

As shown in Table 16, the bubble point of Product-5 (made from New-1) was 9% greater than the bubble point of Product-5 (made from Reference) and the bubble point of Product-5 (made from New-2) was 17% greater than the bubble point of Product-5 (made from Reference). An increase in bubble point corresponds to an increase in filtration efficiency. Accordingly, Table 16 demonstrates that both Product-5 (made from New-1) and Product-5 (made from New-2), polymeric filtration media disclosed herein, exhibit increased filtration efficiencies compared to Product-5 (made from Reference).

As shown in Table 17, the mean flow pore of Product-5 (made from New-1) was 19% less than the mean flow pore of Product-5 (made from Reference) and the mean flow pore of Product-5 (made from New-2) was 17% less than the mean flow pore of Product-5 (made from Reference). A decrease in mean flow pore corresponds to an increase in filtration efficiency. Accordingly, Table 17 demonstrates that both Product-5 (made from New-1) and Product-5 (made from New-2), polymeric filtration media disclosed herein, exhibit increased filtration efficiencies compared to Product-5 (made from Reference).

Example 9

Bubble Point and Mean Flow Pore for Product-6 (Made From Reference), Product-6 (Made From New-1), and Product-6 (Made From New-2)

Product-6 (made from Reference), Product-6 (made from New-1), and Product-6 (made from New-2) were tested to ascertain bubble point and mean flow pore. The bubble points for Product-6 (made from Reference), Product-6 (made from New-1), and Product-6 (made from New-2) are listed in Table 18 below. The mean flow pores for Product-6 (made form Reference), Product-6 (made from New-1), and Product-6 (made from New-2) are listed in Table 19 below.

TABLE 18

Bubble point for Product-6

| Polymer | Bubble point (inches H$_2$O) | Change in bubble point |
|---|---|---|
| Reference | 127.5 | |
| New-1 | 142.8 | +12% |
| New-2 | 152.2 | +19% |

TABLE 19

Mean flow pore for Product-6

| Polymer | Mean flow pore (μm) | Change in mean flow pore |
|---|---|---|
| Reference | 0.872 | |
| New-1 | 0.812 | −7% |
| New-2 | 0.746 | −14% |

As shown in Table 18, the bubble point of Product-6 (made from New-1) was 12% greater than the bubble point of Product-6 (made from Reference) and the bubble point of Product-6 (made from New-2) was 19% greater than the bubble point of Product-6 (made from Reference). An increase in bubble point corresponds to an increase in filtration efficiency. Accordingly, Table 18 demonstrates that both Product-6 (made from New-1) and Product-6 (made from New-2), polymeric filtration media disclosed herein, exhibit increased filtration efficiencies compared to Product-6 (made from Reference).

As shown in Table 19, the mean flow pore of Product-6 (made from New-1) was 7% less than the mean flow pore of Product-6 (made from Reference) and the mean flow pore of Product-6 (made from New-2) was 14% less than the mean flow pore of Product-6 (made from Reference). A decrease in mean flow pore corresponds to an increase in filtration efficiency. Accordingly, Table 19 demonstrates that both Product-6 (made from New-1) and Product-6 (made from New-2), polymeric filtration media disclosed herein, exhibit increased filtration efficiencies compared to Product-6 (made from Reference).

Example 10

Direct Testing of Liquid Filtration Efficiency

The liquid filtration efficiencies of Product-2b (made from Reference), Product-2b (made from New-2), Product-6 (made from Reference), and Product-6 (made from New-2) were determined according to the following procedure. Filtration of latex spheres dispersed in water through a flat sheet sample of 8 cm in diameter was monitored with a Hiac/Royco (8000A) particle counter equipped with a Hiac/Royco (LD-400) sensor for large particle sizes and a Hach (MC-05) sensor for small particle sizes. A flow rate of 3 GPM was maintained during testing of Product-2b (made from Reference) and Product-2b (made from New-2). A flow rate of 1 GPM was maintained during testing of Product-6 (made from Reference) and Product-6 (made from New-2). Data collection started after waiting for equilibrium with average time to equilibrium being 2-3 minutes. Eight data points were collected at 15 second intervals. All tests were repeated once and the average results were reported.

Figure 11:
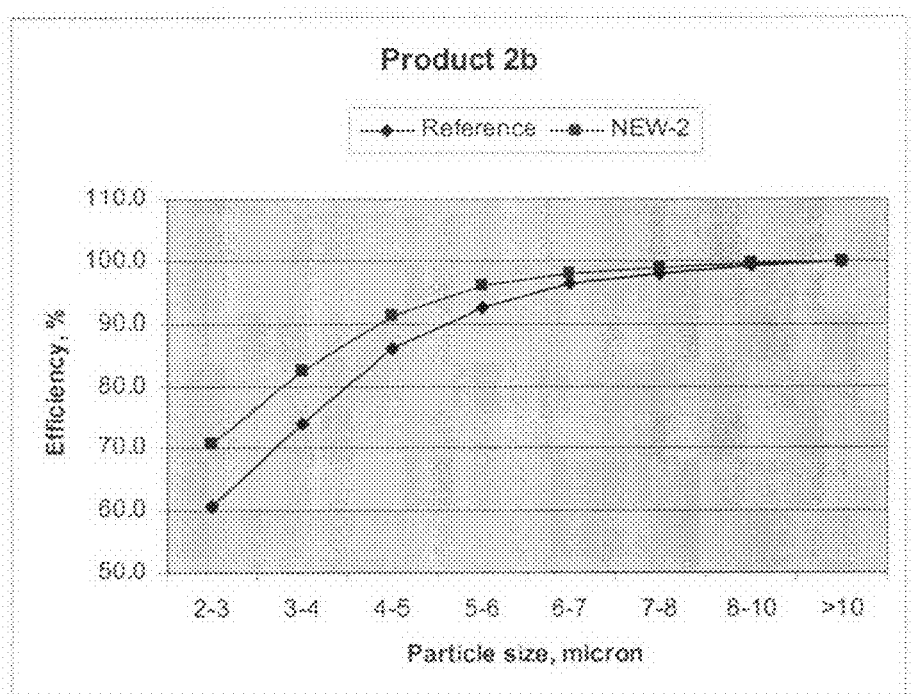
FIG. 11 illustrates liquid filtration efficiency as a function of particle size for Product-2b (made from Reference) and Product-2b (made from New-2) as discussed in Example 10.
Figure 12:
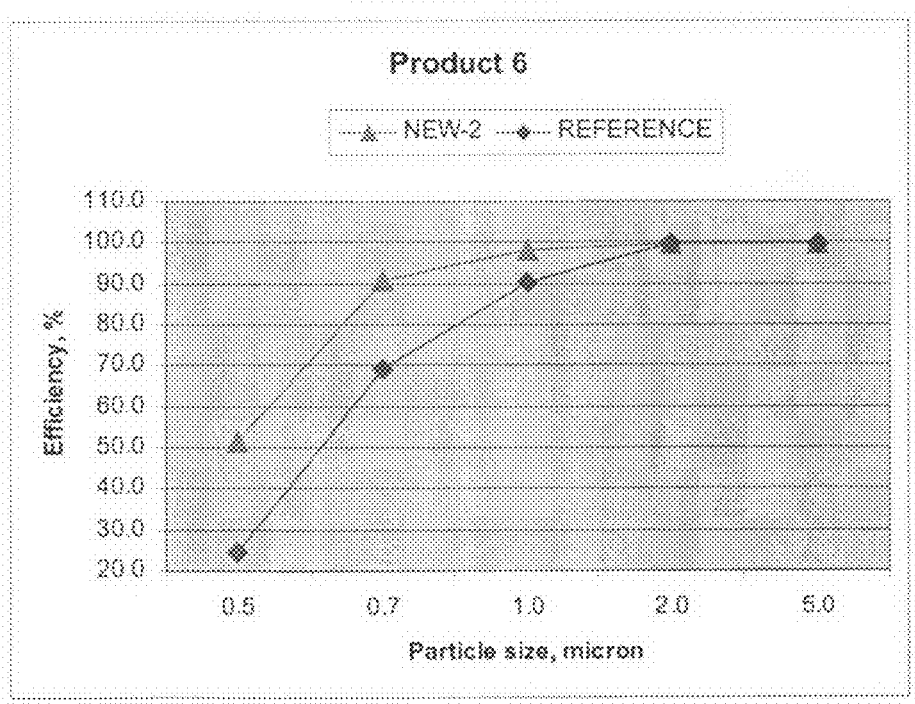
FIG. 12 illustrates liquid filtration efficiency as a function of particle size for Product-6 (made from Reference) and Product-6 (made from New-2) as discussed in Example 10.

The efficiencies of Product-2b (made from Reference) and Product-2b (made from New-2) at various particle sizes are listed in Table 20 below. FIG. 11 plots the efficiency data from Table 20 for Product-2b (made from Reference) and Product-2b (made from New-2). Similarly, the efficiencies of Product-6 (made from Reference) and Product-6 (made from New-2) at various particle sizes are listed in Table 21 below. FIG. 12 plots the efficiency data from Table 21 for Product-6 (made from Reference) and Product-6 (made from New-2).

TABLE 20

Liquid filtration efficiency for Product-2b

| | Efficiency (%) at particle size (μm) referenced Particle size (μm) | | | | | | | |
|---|---|---|---|---|---|---|---|---|
| | 2-3 | 3-4 | 4-5 | 5-6 | 6-7 | 7-8 | 8-10 | >10 |
| Reference | 60.7 | 73.9 | 85.9 | 92.6 | 96.4 | 98.0 | 99.2 | 99.9 |
| New-2 | 70.7 | 82.4 | 91.3 | 96.0 | 98.0 | 99.1 | 99.7 | 99.9 |

TABLE 21

Liquid filtration efficiency for Product-6

| | Efficiency (%) at particle size (μm) referenced Particle size (μm) | | | | |
|---|---|---|---|---|---|
| | 0.5 | 0.7 | 1.0 | 2.0 | 5.0 |
| Reference | 24.2 | 69.3 | 90.1 | 99.9 | 99.9 |
| New-2 | 51.7 | 91.1 | 98.3 | 99.9 | 99.9 |

As shown in Table 20 and FIG. 11, Product-2b (made from New-2), which is a polymeric filtration medium disclosed herein, exhibits increased liquid filtration efficiency as compared to Product-2b (made from Reference), especially at smaller particle sizes.

As shown in Table 21 and FIG. 12, Product-6 (made from New-2), which is a polymeric filtration medium disclosed herein, exhibits increased liquid filtration efficiency as compared to Product-6 (made from Reference), especially at smaller particle sizes.

Liquid filtration efficiencies can be extrapolated to air filtration.

Although the present methods and filtration media have been described in connection with specific embodiments thereof, it will be appreciated by those skilled in the art that additions, deletions, modifications, and substitutions not specifically described may be made without departing from the spirit and scope of the methods and filtration media as defined in the appended claims.

That which is claimed is:

1. A method of making a polymeric filtration medium, comprising:
   melting a polymer having a molecular weight distribution ($M_w/M_n$) between about 1.4 and about 6 and a melt flow rate greater than about 1000 g/10 minutes to provide molten polymer;
   extruding the molten polymer through a plurality of orifices in a die to form continuous primary filaments of polymer;
   attenuating the continuous primary filaments with an air stream to form discrete melt blown fibers of polymer;
   cooling the fibers; and
   collecting the fibers to form at least one fibrous mat of randomly oriented polymeric fibers, and
   wherein the polymeric fibers have an average diameter between about 0.7 μm and about 2.5 μm and between about 20% and about 80% of the polymeric fibers have a diameter $\leq 1$ μm.

2. The method of claim 1, further comprising compressing the at least one fibrous mat of randomly oriented polymeric fibers.

3. The method of claim 2, wherein the compressing step is a hot calendaring step.

4. The method of claim 1, wherein the at least one fibrous mat of randomly oriented polymeric fibers is between 2 and 10 fibrous mats of randomly oriented polymeric fibers.

5. The method of claim 1, wherein the at least one fibrous mat of randomly oriented polymeric fibers is one fibrous mat of randomly oriented polymeric fibers.

6. The method of claim 1, wherein the polymer is a polypropylene polymer made by a metallocene catalyzed polymerization process.

7. The method of claim 1, wherein the at least one fibrous mat of randomly oriented polymeric fibers filters 0.7 μm diameter particles in fluids at an efficiency of at least 90%.

8. The method of claim 1, wherein the at least one fibrous mat of randomly oriented polymeric fibers filters 1 μm diameter particles in fluids at an efficiency of at least 98%.

9. The method of claim 1, wherein the orifices are 0.010" in diameter and the die comprises 50 orifices per inch.

10. A polymeric filtration medium made by the method of claim 1.

11. A polymeric filtration medium, comprising:
    at least one fibrous mat of randomly oriented fibers of a polymer, wherein the polymer has a molecular weight distribution ($M_w/M_n$) between about 1.4 and about 6 and a melt flow rate greater than about 1000 g/10 minutes, and wherein the fibers have an average diameter between about 0.7 μm and about 2.5 μm and between about 20% and about 80% of the fibers have a diameter $\leq 1$ μm.

12. The polymeric filtration medium of claim 11, wherein the polymer is a polypropylene polymer made by a metallocene catalyzed polymerization process.

13. The polymeric filtration medium of claim 11, wherein the at least one fibrous mat of randomly oriented polymeric fibers is between 2 and 10 fibrous mats of randomly oriented polymeric fibers that have been compressed together.

14. The polymeric filtration medium of claim 11, wherein the at least one fibrous mat of randomly oriented polymeric fibers is one fibrous mat of randomly oriented polymeric fibers that has been compressed.

15. The polymeric filtration medium of claim 11, wherein the polymeric filtration medium filters 0.7 μm diameter particles in fluids at an efficiency of at least 90%.

16. The polymeric filtration medium of claim 11, wherein the polymeric filtration medium filters 1 μm diameter particles in fluids at an efficiency of at least 98%.

17. A method of filtering a fluid, comprising:
filtering a fluid stream through at least one nonwoven fiber mat of randomly oriented fibers of polymer to provide a filtered fluid stream, wherein the polymer has a molecular weight distribution ($M_w/M_n$) between about 1.4 and about 6 and a melt flow rate greater than about 1000 g/10 minutes, and wherein the fibers have an average diameter between about 0.7 μm and about 2.5 μm and between about 20% and about 80% of the fibers have a diameter $\leq$1 μm.

18. The method of claim 17, wherein the fluid is a liquid or a mixture of liquids.

19. The method of claim 17, wherein the fluid is a gas or a gaseous mixture.

20. The method of claim 19, wherein the gaseous mixture is air.

21. The method of claim 17, wherein the polymer is a polypropylene polymermade by a metallocene catalyzed polymerization process.

22. The method of claim 17, wherein the at least one fibrous mat of randomly oriented polymeric fibers is between 2 and 10 fibrous mats of randomly oriented polymeric fibers that have been compressed together.

23. The method of claim 17, wherein the at least one fibrous mat of randomly oriented polymeric fibers is one fibrous mat of randomly oriented polymeric fibers that has been compressed.

24. The method of claim 17, wherein the filtration step filters 0.7 μm diameter particles in the fluid stream at an efficiency of at least 90%.

25. The method of claim 17, wherein the filtration step filters 1 μm diameter particles in the fluid stream at an efficiency of at least 98%.

26. A composite filtration medium, comprising:
a first upstream layer comprising at least one nonwoven fiber mat of randomly oriented fibers of a polymer prepared in accordance with claim 1, wherein the polymer has a molecular weight distribution ($M_w/M_n$) between about 1.4 and about 6 and a melt flow rate greater than about 1000 g/10 minutes, and wherein the fibers have an average diameter between about 0.7 μm and about 2.5 μm and between about 20% and about 80% of the fibers have a diameter $\leq$1 μm; and
a second downstream layer bonded to the first upstream layer, the second downstream layer comprising at least one polymer membrane.

* * * * *